Aug. 23, 1960    H. E. ROSENBERGER ET AL    2,949,815
PREHEATING MEANS FOR SLIDE PROJECTORS
Filed March 4, 1958    2 Sheets-Sheet 1

HAROLD E. ROSENBERGER
JOHN L. GOODYEAR
INVENTORS

ATTORNEYS

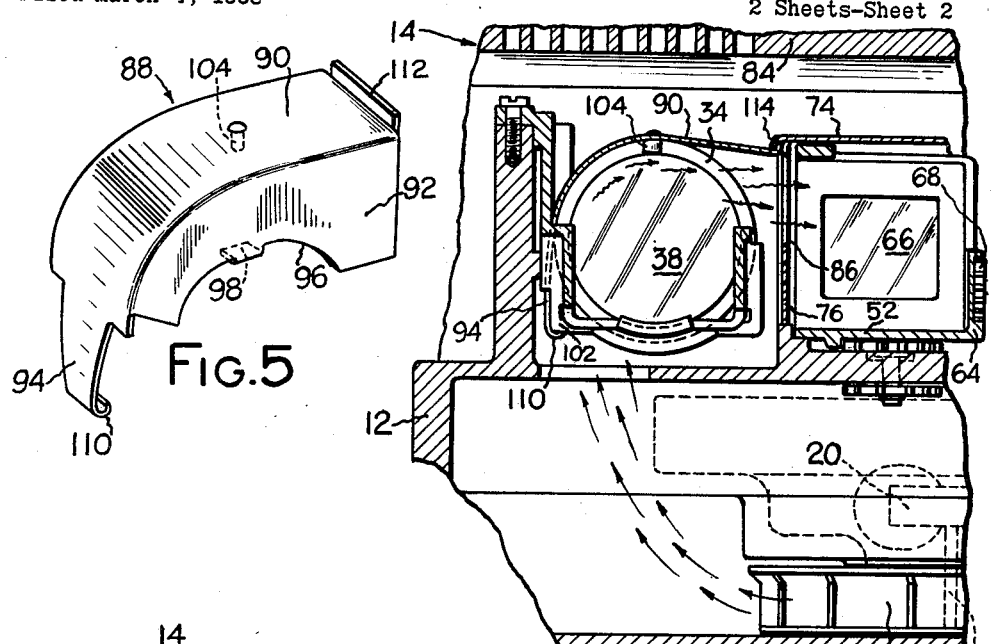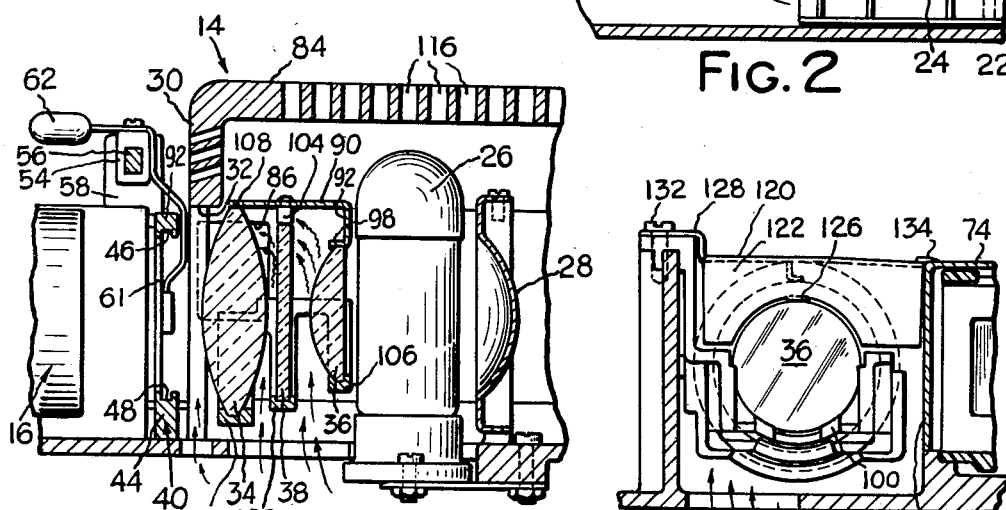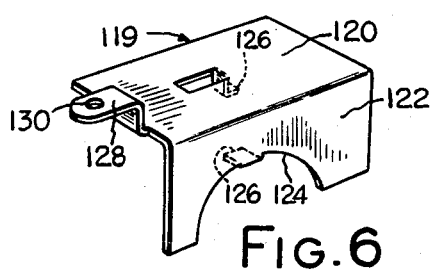

United States Patent Office 2,949,815
Patented Aug. 23, 1960

2,949,815

PREHEATING MEANS FOR SLIDE PROJECTORS

Harold E. Rosenberger, Brighton, and John L. Goodyear, Greece, N.Y., assignors to Bausch & Lomb Optical Company, Rochester, N.Y., a corporation of New York Filed Mar. 4, 1958, Ser. No. 719,024

2 Claims. (Cl. 88—28)

This invention relates to projection apparatus and more particularly it has reference to projectors of the type which are used to project images of transparencies such as films and slides.

Films which are supported only at their edges during projection, are subject to buckling under the action of heat which reaches the film from the projection light source. Therefore, when projecting an image on a screen, the operator would initially focus the projector for a film as the same is brought into projecting position, and after buckling or "popping" has occurred he would have to refocus the projector in order to have the projected image sharply in focus. In the widely used colored film transparencies or "slides," the emulsion coated film is held in apertured cardboard mounts so that the picture area is unsupported and when such slides are projected they are subject to buckling due to heat in the projected light beam so that refocusing of the projector is necessitated.

One of the objects of this invention is to provide a projector which will overcome the aforementioned disadvantages.

Another object of the present invention is to provide a projector in which slides are pre-conditioned in order to buckle them before they are stationed in projection position.

Under the present invention, air is heated by directing it into contact with the surfaces of a heat absorbing glass member located in the path of light rays between the lamp and the projection position or film aperture. The air thusly heated is then directed by a baffle element through an opening formed in a wall of the housing which separates it from a slide magazine holder. The opening in this wall is of a size to permit the flow of heated air onto two or three slides which are in a position ready to be moved seriately into projection position. In this manner, hot air, of a temperature sufficient to buckle the film, is applied to a number of slides before they are moved into alignment with the optical system of the projector thereby inducing buckling of the film in the slides and conditioning the film for the particular projecting arrangement of the optical system.

Other objects and advantages will appear from the following description taken in conjunction with the drawings, wherein:

Fig. 2 is a fragmentary sectional view through the light source housing as viewed along the line 2—2 of Fig. 1;

Fig. 3 is a fragmentary sectional view through part of the housing as viewed along the line 3—3 of Fig. 1;

Fig. 4 is a fragmentary sectional view through another part of the housing but showing another embodiment of the invention as viewed along the line 4—4 of Fig. 1;

Fig. 5 is a perspective view of the embodiment of the baffle plate shown in Fig. 1; and Fig. 6 is a perspective view of the baffle plate shown in Fig. 4.

Figure 1:
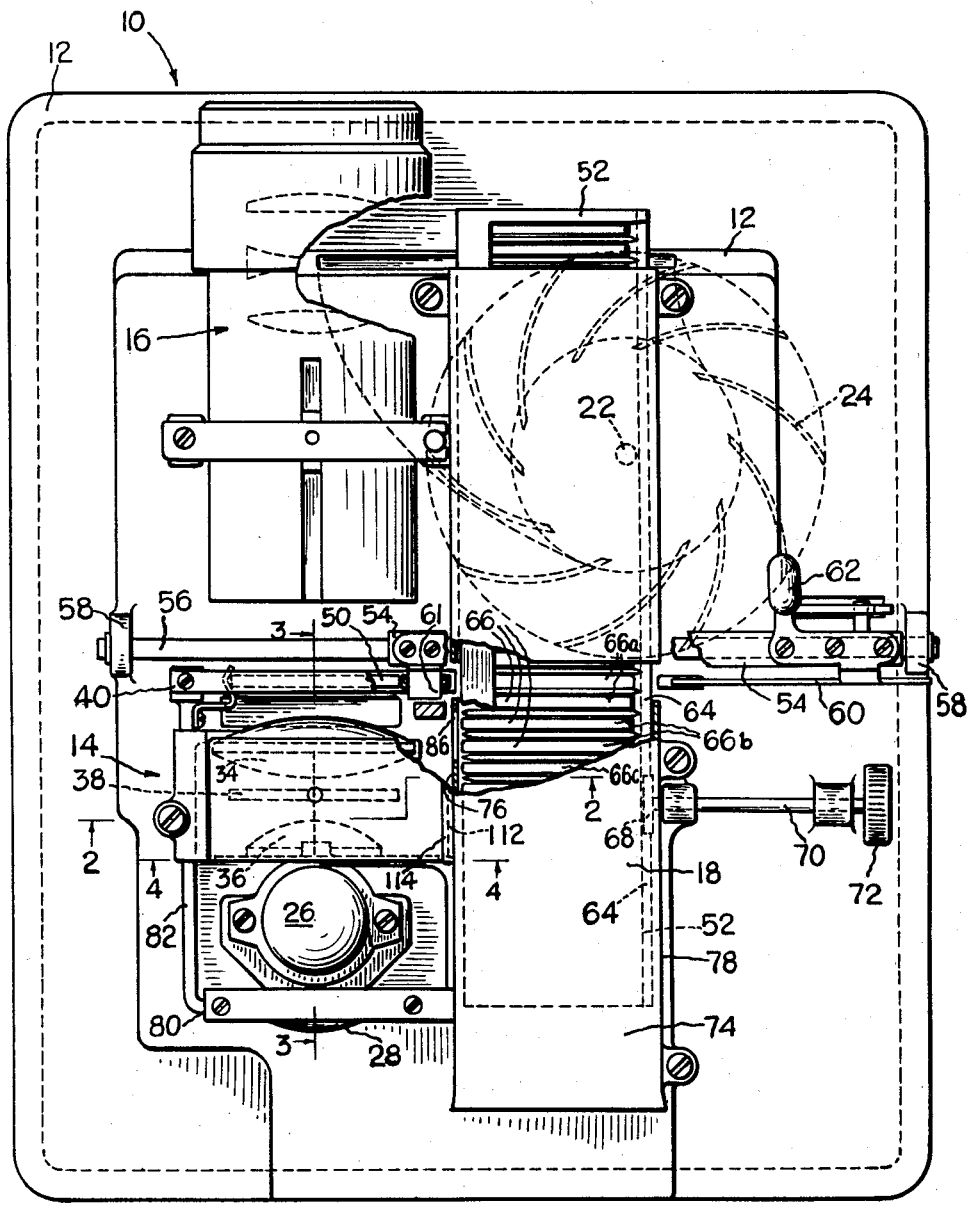
Fig. 1 is a plan view, partly in section, showing the present invention with one embodiment incorporated in a slide projector.

A conventional slide projector is shown generally at 10 in Fig. 1 and comprises a base or casing 12, a lamp housing 14, a projection lens assembly generally indicated at 16 and a slide magazine tunnel or tray holder at 18 for holding a slide tray.

As shown in Fig. 2, the base 12 has mounted interiorly thereof an electric motor 20 which serves to rotate a shaft 22 extending vertically downwardly from the motor. A radial flow impeller or fan 24 is mounted and secured to the remote lower end of the shaft and upon rotation of the fan 24, air is drawn into the casing 12 and forced into the housing 14 as shown by the arrows.

The housing 14 has suitably mounted therein a light source or lamp 26 and a reflector 28 arranged to the rear of the lamp. At the forward end of the housing 14 the front wall 30 thereof is formed with an aperture 32 which has its axis in alignment with the optical axis of the projection lens assembly 16. A plurality of condenser lenses 34, 36, are positioned between the lamp and the wall 30 and these lenses are in optical alignment with the assembly 16 and the lamp. A suitable heat absorbing glass member such as the plano plate 38 is positioned between the lenses 34, 36 and serves to absorb much of the heat transmitted by the lamp 26 which would normally impinge upon a film being projected. Intermediate the condenser lenses 34 and the adjacent end of the projection lens assembly 16 and coaxially aligned therewith is a slide frame holder or film gate 40 (see Figs. 1 and 3) which may be rigidly mounted in the base 12 adjacent the wall 30. The holder comprises a pair of upper and lower rails 42, 44 which are formed with inwardly opposed grooves 46, 48, respectively, for slidingly holding a film slide 50 which, when in the position shown in Fig. 1, is in the path of the light beam projected from the lamp, through the condenser lens and the aperture 32.

The film slide 50 is normally carried in a magazine tray 52 which may house anywhere up to 40 or more slides and for purposes of the invention any suitable sliding mechanism of the automatic or manually actuated type may be employed to remove a slide from the tray 52, position it in the film gate or frame holder 40 and return the slide to its previous position within the tray. For purposes of simplicity, a manually actuated sliding mechanism is shown and takes the form of a slide head 54 slidably mounted on a horizontally disposed rail 56 which is mounted on the base 12 by a pair of uprights 58 secured thereto. A curved finger 60 is secured to one end of the head 54 and serves to remove the slide 50 from the tray 52 and a second finger 61 secured to the other end of the head serves to return the slide to the tray when the head 54 is moved to the left and right, respectively.

In the position shown in Fig. 1, the finger 60 has completed its movement to the right and would have carried along therewith the slide 50, however, in order to avoid congestion of these structural parts in the drawing and to better illustrate the relative position of the slide 50, the same has been illustrated in a projection position. Normally, with the head 54 in the position indicated, the slide would be positioned in the tray 52 and there would be no slide in projection position. A handle 62 mounted on the head 54 facilitates the sliding movement of the head on the rail 56 between the uprights 58. Further description of this operation of the sliding mechanism is unnecessary since these mechanisms are old and within the knowledge of those skilled in the art.

The magazine tray 52 is slidably received into the holder 18 and may be of any suitable type but for purposes of description, a type employing a gear rack 64 is shown. The gear rack 64 may be formed on the frame of the tray or be a separate rack mounted in the tray and is utilized for feeding the tray in one direction for positioning each of the various film slides 66 successively in alignment with the slide frame 40. A gear 68, secured to one end of a shaft 70 which is rotatably mounted on the base 12, serves to move the tray 52 upon step by step rotation of the shaft 70. A knob 72 on the other end of the shaft remote from the gear 68 is provided to facilitate manual rotation of the gear. It will be apparent that an operator may position a film slide to be projected in alignment with the frame 40 by simply manipulating the knob 72 until this is accomplished. By actuating the head 54 to a position to the left of that shown in Fig. 1, a slide 50 will be removed from the tray and positioned in the frame 40.

As previously stated, the tray 52 is adapted to be secured in the holder 18 which comprises a top plate 74 and side walls 76, 78 which are secured upon the top surface of the base 12 to form an elongated box-like frame open at both ends to permit the ingress and egress movement of the tray. The wall 76 also serves as one wall of the housing 14 which is defined by the end wall 30, a rear wall 80, a side wall 82 and a top wall 84 which for all practical purposes may consist of a cover for a portion of the projector 10.

As seen in Figs. 1, 2 and 3, the side wall 76 of the housing is formed with a generally rectangular opening 86 adjacent the forward end wall 32. The opening 86 is of such dimension as to expose two or three of the film slides in the tray immediately adjacent to the vacant space or channel in the tray 52 which was occupied by the film slide 50. As shown in Fig. 1, the opening 86 is aligned with the rear surface of the film slide 66 and both surfaces of the slides 66b and 66c. In this manner, each of the slides 66a, 66b and 66c will be opposite the opening 86 for at least two positionings of the tray during the course of projection of the slides 66. When the slide 50 is moved back to its normal position on the tray and the latter is advanced a distance of one slide spacing, the slide 66a will be in position to be moved into projection position and the slide 66b will be in the position formerly occupied by the slide 66a.

The opening 86 serves to permit hot air which will be heated in the housing 14 to flow into the interior of the tray holder 18 wherein the adjacent film slides 66a, 66b, 66c will be heated sufficiently to cause buckling of the same prior to their movement into projection position. Hot air is directed through the opening 86 with the aid of a baffle means mounted above the condenser lenses 34, 36 and the heat absorbing plate 38.

In the preferred embodiment of the baffle means, attention is directed to Figs. 1, 2, 3 and 5 wherein there is shown a baffle element 88 which is formed with a downwardly curved upper or top plate 90 having a flange portion 92 depending therefrom along one edge and an extension portion 94 which may be made a part of the plate 90. The lower edge 96 of the flange portion 92 is partly formed with a semi-circle configuration and is provided with a bent lug 98 which is adapted to engage the upper edge of the condenser lens 36 thereby holding the same against inadvertent displacement in an upward direction from its mounting 100. Similarly, the heat absorbing plate 38 is held in its mount 102 by a button 104 secured to the under surface of the plate 90 and the condenser lens 34 is held in its mount 106 by the edge 108 of the plate 90. The extreme lower end of the extension 94 is formed as a curved elongated hook 110 for engaging one edge of the mount 102 thereby securing the end of the baffle element 88. The end of the plate 90 remote from the extension portion 94 is bent upwardly into a flange 112 which is adapted to engage the interior surface of a downwardly projecting flange 114 formed from the wall 74 of the tray holder 18. In this manner, the baffle element 88 is securely locked in position above the two condenser lenses and the heat absorbing plate and serves a dual purpose: that of locking these elements in place, and, as will be described hereinafter, to direct the flow of hot air into the tray holder 18. The ends of the plate 90 and the portion 92 adjacent the flange 112 are adapted to coincide with the top and rear sides of the opening 86 when the baffle 88 is mounted within the housing.

While the glass heat absorbing member has been shown and described as being in the form of a plano plate 38 located between the two condenser lenses 34 and 36, the glass plate 38 could be eliminated if one or both of the lenses 34 and 36 were made of heat absorbing glass. Air passing over the surfaces of the lenses so constructed would be heated and directed by the baffle plate onto the slides.

*Operation*

It will be assumed that the electric current supply (not shown) for the projector 10 is such as to energize the electric motor 20 and the lamp 26 simultaneously, or, at least, will permit operation of the motor before the lamp is allowed to become energized. Since circuits of this sort are well known in the art, further description of the same will be unnecessary.

With the motor 20 energized and the fan 24 rotating, relatively cool air will be drawn from the surrounding atmosphere and into the base 12 which will serve as an air duct for the transmission of air. The flow of air is directed upwardly into the housing 14 through the opening therebelow as indicated by the arrows. Within the housing a portion of the air is permitted to circulate around the lamp 26 for cooling the same and is conducted out of the housing through suitable ports 116 formed in the upper wall 84 of the housing. Another portion of the air flowing into the housing is permitted to circulate between the condenser lenses 34, 36 and around the heat absorbing plate 38 whereby the air is heated by the latter. The flowing hot air thus heated is directed from the housing through the opening 86 by the baffle plate 90 and the flange portion 92 which serve as a duct means for the conveyance of hot air. The hot air flowing through the opening 86 impinges upon the rear surface of the film slide 66a and both surfaces of the two slides 66b, 66c causing buckling of the same as they stand in readiness to be moved into projection position. The area of the opening 86, the fan capacity, the openings 116 and the size of the heat absorbing capacity of the plate 38 are accordingly dimensioned in order to allow only enough heat to come in communication with the film slides for causing buckling without any danger of damaging the film in the slides while at the same time insuring that the film slides will remain buckled until their projection period has terminated.

In the embodiment shown in Figs. 4 and 5, the baffle element has a different shape than that shown in the previously described embodiment, however, the function of both is the same. As shown in Fig. 6, the baffle element 119 comprises a top baffle plate 120 and a downwardly extending flange portion 122 secured to one side edge thereof. The flange portion 122 has its lower edge 124 shaped as a semi-circle in order to clear the upper circular edge of the condenser lens 36 and is provided with an inwardly projecting lug 126 for engaging the lens 36 and holding the same in its mount 100. A downwardly projecting angled member 126 is stamped from the plate 120 and is adapted to engage the upper edge of the heat absorbing plate 38 for maintaining the same in its mounted position. Similarly, the lens 34 is also maintained in its mounted position by engaging the edge of the plate 120 remote from the flange portion 122. A mounting strip 128 extends from one edge of the plate 120 and is formed with an aperture 130 for receiving the screw 132 which serves to attach the mounting structure for the condenser lenses 34, 36 and the plate 38 upon the base 12. The other end of the plate 120 is detachably secured to the upper wall 74 of the tray holder by a protruding edge 134 of that wall which may be conveniently formed by cutting and bending a portion of the wall 76 until the bent portion is in a plane parallel to that of the top wall 74, see Fig. 4. Thus, the baffle element may be easily assembled and disassembled to the base 12 and the tray holder 18.

From the foregoing description, it will be appreciated that the present invention provides means for directing the flow of hot air upon a plurality of film slides just prior to their movement into projecting position thereby inducing buckling or "popping" of the film. This preconditioning of the film slides obviates the need for refocusing the slide when in projecting position and results in a continuous accurately-focused projection of all of the slides which are to be projected. The baffle means for directing some of the hot air upon the film slides awaiting to be projected is made by a simple stamping operation from a single piece of material. The heat is indirectly derived from the light source through the instrumentality of the heat absorbing plate, thus there are no costly heat transfer mechanisms involved.

While there is in this application specifically described two forms which the invention may assume in practice, it will be understood that the form is shown for purposes of illustration, and that the same may be modified and embodied in various other forms or employed in other uses without departing from its spirit or the scope of the appended claims.

We claim:

1. In a slide projector, the combination of a housing, a light source in the housing, lens means aligned with the source for projecting an image of a film held in projection position, transparent heat absorbing means aligned with said lens means and positioned in said housing for absorbing some of the heat from the light rays passing through the lens means, a magazine for holding in spaced relation a plurality of films to be projected, said magazine being slidably disposed within a tunnel positioned adjacent a wall of the housing and the projection position, means for forcing air into the housing where a portion thereof is heated by the heat absorbing means, said wall having an opening formed therethrough effecting communication between the housing and tunnel adjacent the films in the magazine which are adjacent the projection position, means for directing the flow of a portion of the heated air from the heat absorbing means through the opening to produce buckling of the films adjacent the projection position, and means for seriately moving the buckled films into projection position whereby a film will remain in buckled condition during projection so that the focus of the image projected from the film will be constant.

2. A slide projector comprising walls defining a housing, a light source in the housing, lens means aligned with the source for projecting an image of a film held in projection position, transparent heat absorbing means aligned with said lens means and positioned in said housing for absorbing some of the heat from the light rays passing through the lens means, means for forcing air under pressure into the housing where a portion thereof is heated by the heat absorbing means, a magazine for holding in spaced relation a plurality of films adjacent the projection position, a tunnel for slidably mounting said magazine and having an opening adjacent said projection position, one of said walls of said tunnel having an air inlet formed therethrough adjacent the projection position, baffle means arranged above said heat absorbing means, said baffle means including a top plate and at least one flange portion depending therefrom, said plate and portion having end portions extending toward adjacent edges of the air inlet for directing the flow of said portion of heated air through the air inlet to produce buckling of the films adjacent the projection position, and means for seriately moving the buckled films from said tunnel opening into projection position whereby a film will remain in buckled condition during projection so that the focus of the image projected from the film will be constant.

References Cited in the file of this patent

UNITED STATES PATENTS

| | | |
|---|---|---|
| 1,716,322 | Proctor | June 4, 1929 |
| 1,966,531 | Tint | July 17, 1934 |
| 2,038,784 | Ghadiali | Apr. 28, 1936 |
| 2,294,219 | Woermann | Aug. 25, 1942 |
| 2,627,017 | Howard | Jan. 27, 1953 |
| 2,727,430 | Goldberg | Dec. 20, 1955 |